United States Patent
Trebbi et al.

(10) Patent No.: US 6,866,493 B2
(45) Date of Patent: Mar. 15, 2005

(54) TABLET PRESS MACHINE

(75) Inventors: Roberto Trebbi, Castenaso (IT); Hans Kramer, Köln (DE)

(73) Assignee: I.M.A. Industria Macchine Automatiche S.p.A., Ozzano Emilia (IT)

(*) Notice: Subject to any disclaimer, the term of this patent is extended or adjusted under 35 U.S.C. 154(b) by 20 days.

(21) Appl. No.: 10/240,727
(22) PCT Filed: Feb. 7, 2002
(86) PCT No.: PCT/IB02/00375
  § 371 (c)(1),
  (2), (4) Date: Oct. 8, 2002
(87) PCT Pub. No.: WO02/064356
  PCT Pub. Date: Aug. 22, 2002

(65) Prior Publication Data
  US 2003/0054063 A1 Mar. 20, 2003

(30) Foreign Application Priority Data
  Feb. 15, 2001 (IT) .................... B02001A0082

(51) Int. Cl.⁷ .................. B29C 43/08; B30B 11/10
(52) U.S. Cl. ............ 425/107; 425/345; 425/348 R; 425/215
(58) Field of Search ............ 425/78, 90, 107, 425/345, 215, 217, 348 R, 351

(56) References Cited

U.S. PATENT DOCUMENTS

| | | | |
|---|---|---|---|
| 3,533,360 A | | 10/1970 | Kibbel |
| 3,779,305 A | * | 12/1973 | Pondelicek et al. ......... 164/312 |
| 4,854,152 A | * | 8/1989 | Portmann .................. 100/214 |
| 5,076,343 A | * | 12/1991 | Sandercock ............... 164/267 |
| 5,462,427 A | | 10/1995 | Kramer |
| 6,482,349 B1 | * | 11/2002 | Kohara et al. ............ 425/352 |

FOREIGN PATENT DOCUMENTS

| | | |
|---|---|---|
| DE | 24 62 102 A1 | 1/1976 |
| DE | 295 16 577 U1 | 2/1996 |
| DE | 199 63 263 A1 | 9/2000 |
| EP | 01241396 | 9/1989 |

* cited by examiner

Primary Examiner—Robert Davis
Assistant Examiner—Thu Khanh T. Nguyen
(74) Attorney, Agent, or Firm—Arent Fox PLLC

(57) ABSTRACT

A tablet press machine (100) comprises: a hopper (1) for feeding a powder or granular product (2) to a first disc (3a) that rotates about an axis (X) and is equipped with evenly distributed holes or dies (3); a second and third disc (4, 6) that are positioned above and below the first disc (3a), respectively, rotate about the axis (X) and support respective pluralities of upper and lower reciprocating punches (5, 7). The punches (5, 7) are driven towards and away from each other when they are aligned with the dies (3) in such a way as to compress the product (2). Each of the punches (5, 7) comprises a cylindrical shank (8), one end of which is equipped with a working head (10) and sealed protection means (11) acting on the cylindrical shank (8) itself. The sealed protection means (11) comprise, for each punch (5, 7), a concertinaed sleeve (12) covering the cylindrical shank (8) and having an annular portion (13) constituting its far end relative to the working head (10), forming an annular seal and providing also a removable element used to attach support means (14) that protrude from the respective disc (4, 6). The near end (15) of each concertinaed sleeve (12) relative to the working head (10) presents an enlarged annular portion (16) that engages with a matching annular groove (17) in the cylindrical shank (8) to provide a tight seal.

5 Claims, 2 Drawing Sheets

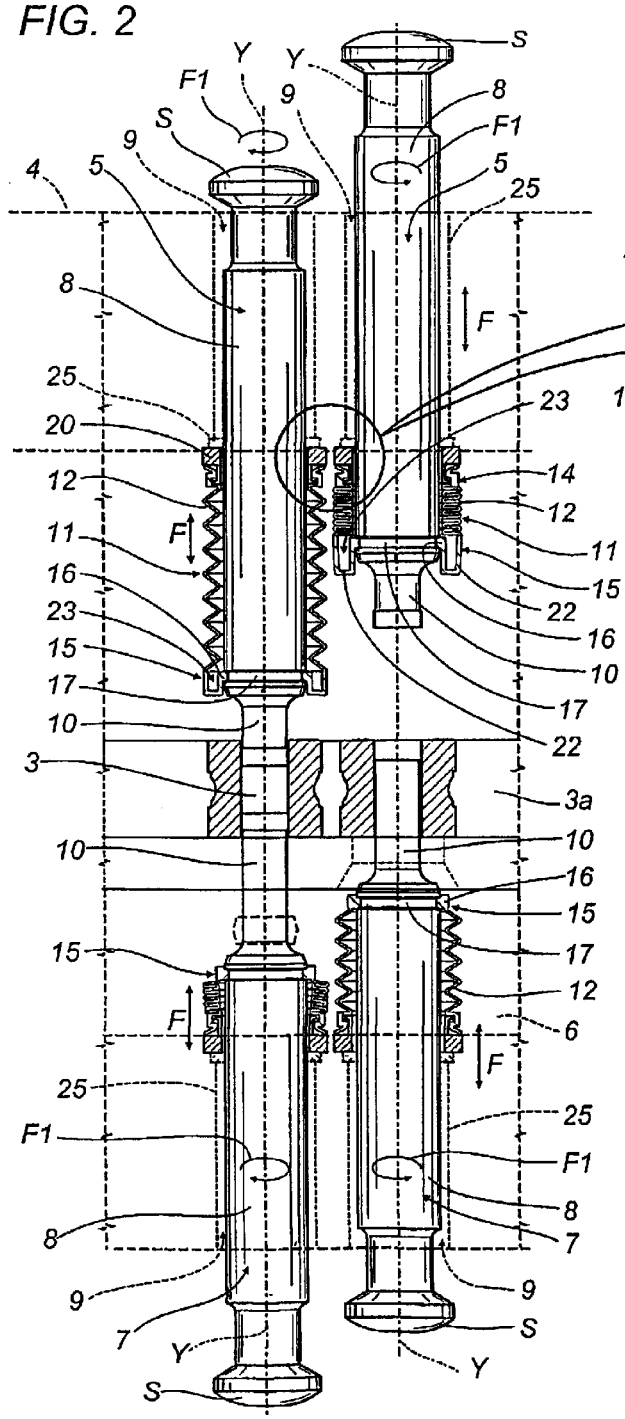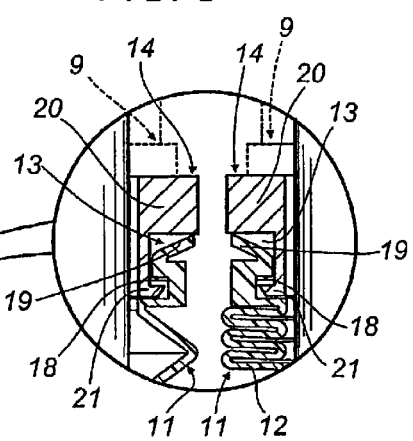

TABLET PRESS MACHINE

TECHNICAL FIELD

The present invention relates to a tablet press machine used for the production of tablets.

BACKGROUND ART

At present, tablets, especially tablets used in the pharmaceutical field, are made by compressing a powder or granular product under high pressure.

This operation is performed by machines known as rotary tablet presses that essentially comprise a main operating unit with a central hopper designed to enable the product to be volumetrically dosed into a plurality of holes or dies located in a first rotating disc and equally distributed round the circumference of the disc. The first disc is positioned between another two discs that rotate in synchrony with it. These two discs mount a corresponding plurality of upper and lower, reciprocating punches driven by appropriate cam mechanisms that move the punches towards one another in pairs in a vertical direction in such a way that they enter the corresponding hole or die and compress the product to form a tablet. The upper and lower punches are then moved away from each other and the tablet made is ejected into an appropriate container.

The operating unit described above is located inside a sealed chamber structure isolated from the outside environment so that the production zone is kept clean and free of contamination by external agents, thus ensuring compliance with the safety regulations and hygiene specifications of the pharmaceutical industry.

Each punch normally comprises a cylindrical shank equipped at one end with a working head having a rounded, cap shaped surface. The above mentioned cam means act on the rounded surface of the working head in such a manner as to drive each pair of punches up and down into a die located in the rotating disc.

In view of the high speeds reached by the punches during the compression of the product, each cylindrical shank must be protected not only against wear due to its rapid working movements but also against external agents that might prevent the shank from sliding smoothly against the sides of the die. To achieve this, each shank is usually partly covered by sealed protection means and supplied with a lubricating fluid. The protection means must therefore be designed to prevent contact between the lubricant and the product, as well as contact between the cylindrical shank and external agents, and must also provide the punches with an effective seal during the frequent cleaning and disinfecting cycles performed inside the production chamber.

In a first known solution described, for example, in U.S. Pat. No. 5,462,427, the sealed protection consists of a single plastic cover over the entire external surface of each rotating disc. For each punch, the cover has a concertinaed portion with an annular sector for each punch shank on each disc.

This type of protective cover is very effective but, because it is a single part and therefore has a complex shape, takes a considerable amount of time to be fitted over the discs and punches. This also greatly increases the cost of this type of solution.

To overcome these drawbacks, German patent DE 29516577 discloses a solution whereby each single punch, both upper and lower, that moves with vertical, reciprocating motion, is enclosed in a plastic concertinaed sleeve connected, at the far end relative to the working head, to an annular seat made in the disc, and at the near end to a groove made close to the punch head.

This type of sealed protection works well on reciprocating punches that move only straight up and down but cannot be used on punches which, in addition to the reciprocating vertical motion, also revolve about their respective, longitudinal axes as the turret rotates, the revolving motion being an effective technical solution now frequently adopted to enable the drive means to apply pressure uniformly on the rounded cap-shaped surfaces of the punch heads in order to reduce wear on the punch heads themselves.

In the solution taught by the above mentioned German patent DE 29516577, the impossibility of using punches that revolve about their longitudinal axes is due to the fact that the far end connection of the concertinaed sleeve to the mounting disc is rigid and, if the punch itself were also made to revolve, would cause the concertinaed sleeve to twist and break.

DISCLOSURE OF THE INVENTION

The aim of the present invention is to overcome the above mentioned drawbacks by providing a tablet press with a reliable and practical arrangement for sealing the punches in such a way as to prevent contamination from the inside out and from the outside in and designed especially for rotatably mounted punches which revolve about their longitudinal axes.

Accordingly, the present invention provides a tablet press machine comprising a hopper for feeding a powder or granular product to a first disc that rotates about a vertical axis and is equipped with evenly distributed holes or dies; a second disc and a third disc that are positioned, respectively, above and below the first disc, and that rotate about said vertical axis and support respective pluralities of upper and lower reciprocating punches; means for driving the punches in pairs in synchronised, reciprocating fashion towards and away from each other when each pair is aligned with one of the the dies on the first disc; each of the punches comprising a cylindrical supporting shank slidably engaged with a matching seat formed in the disc and being equipped at one end with a working head upon which the drive means act; and sealed protection means fitted to each cylindrical shank of each punch, the protection means consisting of concertinaed sleeves; the machine being characterised in that each concertinaed sleeve has an annular portion constituting its far end relative to the working head, forming an annular seal and providing also a removable element used to attach support means that protrude from the respective disc; the near end of each concertinaed sleeve relative to, the working head presenting an enlarged annular portion that engages with a matching annular groove in the cylindrical shank to provide a tight seal.

The technical characteristics of the invention, with reference to the above aims, are clearly described in the claims below and its advantages are apparent from the detailed description which follows, with reference to the accompanying drawings which illustrate a preferred embodiment of the invention provided merely by way of example without restricting the scope of the inventive concept, and in which:

FIG. 2 is a front detail view, with some parts in cross section to better illustrate others, of a part of the machine illustrated in FIG. 1;

FIG. 3 is an enlarged front view of a detail from FIG. 2.

Figure 1:
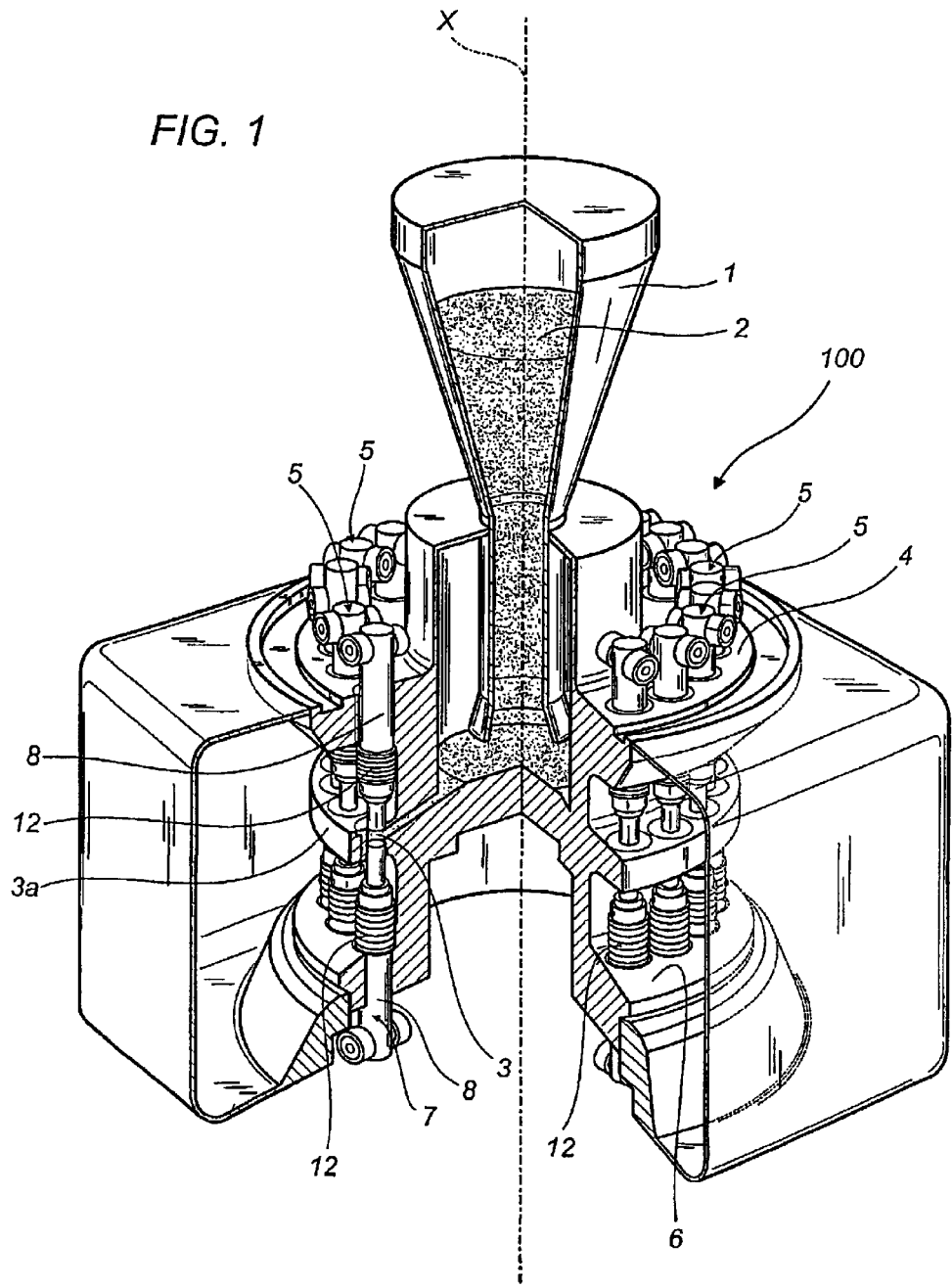
FIG. 1 illustrates a tablet press machine made according to the present invention, in a schematic perspective view with some parts shown in cross section and others cut away for clarity.

With reference to the accompanying drawings, in particular FIG. 1, the tablet press machine according to the present invention, labelled 100 in its entirety, is used to manufacture tablets, (not illustrated), especially tablets for pharmaceutical purposes, by compressing a powder or granular product according to a customary method.

As shown in FIG. 1, the tablet press 100 comprises a central hopper 1 for dosing a powder or granular product 2 into a plurality of holes or dies 3 located round the circumference of a first disc 3a that rotates about a vertical axis X.

An upper second disc 4 that also rotates about the axis X and that mounts a first plurality of upper punches 5 equally distributed round its circumference, is positioned above the first disc 3a, and a lower third disc 6, that also rotates about the axis X and that mounts a second plurality of lower punches 7 facing the plurality of upper punches 5, is positioned below the first disc 3a.

The upper and lower punches 5 and 7 are designed to move alternately up and down in both directions (see arrows F in FIG. 2), synchronised with each other and with the dies 3, driven by cam means (which are not illustrated since they are of customary type and do not strictly form part of the invention). In particular each pair of facing punches 5 and 7 performs a working stroke between a position in which the punches 5 and 7 are close to each other (see FIG. 2) at one of the dies 3, in such a way that they compress the dosed product 2 present in the die 3 to form tablets, and a position in which, after compressing the product 2, they are apart and away from the die 3 to enable the tablets to be ejected and stored in appropriate containers (not illustrated).

As shown in FIG. 2, each of the punches 5, 7, comprises a cylindrical shank 8 that is slidably mounted in a matching seat 9 in the respective disc 4 or 6.

One end of each cylindrical shank 8 is equipped with a working head 10 having a rounded, cap shaped surface S (FIG. 2).

While the discs 3a, 4 and 6 rotate about the axis X, each punch 5 and 7, in addition to performing the above mentioned vertical working stroke, can revolve about its axis Y (arrow F1 in FIG. 2) either freely or driven by customary drive means which are snot illustrated: the revolving motion is an effective technical solution now frequently adopted to enable the cam drive means to apply pressure uniformly on the rounded cap-shaped surfaces S of the heads 10 of the punches 5, 7 in order to reduce wear on the heads 10 of the punches 5, 7 themselves.

As shown in more detail in FIGS. 2 and 3, sealed protection means 11 are fitted to each cylindrical shank 8.

The sealed means 11 are necessary to protect the shank 8 of each punch 5, 7 from external agents that might negatively affect operation because the cylindrical shank 8 must be continuously lubricated with a suitable lubricating fluid circulating in specially made channels 25 in the discs 4, 6 (indicated by dashed lines in FIG. 2) without, under any circumstances, allowing the lubricating fluid to escape and come into contact with the powder product used to make the tablets.

Looking in more detail, the sealed protection means 11 comprise, for each upper and lower punch 5 e 7, a concertina-shaped sleeve 12 that covers the cylindrical shank 8.

The concertinaed sleeve 12 presents an annular portion 13 that constitutes its far end relative to the working head 10 and that forms an annular seal which also constitutes a removable element used to attach support means 14 that protrude from the respective disc 4, 6.

In addition to this, the concertinaed sleeve 12 presents a near end 15 relative to the working head 10 that has an enlarged, annular portion 16 which engages with a matching annular groove 17 in the cylindrical shank 8 to provide a tight seal.

As better illustrated in FIG. 3, the annular, far end portion 13 (shown in detail) comprises, as a single component, a first section 18 forming a groove used to fit the support means 14, and a second section 19 with an annular flare designed to seal the cylindrical shank 8 from the inside out and from the outside in.

As shown in FIGS. 2 and 3, the means 14 for supporting the concertinaed sleeve 12 comprise, for each punch 5 and 7, a metal ring 20 connected to the respective disc 4 or 6 at each seat 9 that houses the cylindrical shank 8 of the punch 5, 7 itself.

This metal ring 20 is equipped with an annular attachment element 21 protruding from the disc 4, 6 and forming an undercut extending in a direction opposite to the corresponding cylindrical shank 8. The element 21 can be engaged, in removable manner, with the first section 18 in the annular far end portion 13.

Thus, during use, the concertinaed sleeve 12 has a guaranteed oiltight seal at all times, preventing the lubricating fluid from escaping even and especially in the above mentioned case where the punches 5, 7 also revolve about their axes Y while the discs 3a, 4 and 6 rotate.

Again with reference to FIG. 2, it can be noticed that each of the concertinaed sleeves 12 fitted to the upper punches 5 also presents, at the enlarged annular portion 16 of its near end 15, a section 22 that forms an annular chamber 23 for collecting the lubricating fluid.

During use, the annular chamber 23 on each of the concertinaed sleeves 12 on the upper punches 5 uniformly collects the excess lubricant thereby preventing it from collecting (under the effect of gravity) in zones close to the enlarged portion 16 and from applying an excessive load on the enlarged portion 16 which would reduce the effectiveness of the oiltight seal between the enlarged portion 16 itself and the groove 17 in the cylindrical shank 8.

It is also stressed that the aforementioned channels 25, besides allowing the circulation of the lubricating fluid, constitute, during the vertical reciprocating motion of the punches 5, 7 and therefore during the extension/compression (FIG. 2) of the concertinaed sleeves 12, an effective venting system for discharging air from inside the sleeves 12. Advantageously, the channels 25 are made to communicate with each other (in a manner that is not illustrated in FIG. 2) in such a way as to form a single closed circuit in which the air can circulate freely.

The tablet press machine 100, made as described above, achieves the aforementioned aims thanks to the optimum sealing arrangement of the concertinaed sleeves protecting the punches, whether these can move only vertically in both direction or whether they can also revolve about their own axes.

Moreover, the special design of the near and far end portions of the concertinaed sleeves allows the sleeves to be easily fitted and removed from the cylindrical shanks, thus greatly facilitating maintenance of the punches.

In addition to this, the concertinaed sleeves as described above provide a sure and permanent seal not only protecting the upper and lower punches (thanks to the special design of the seal at the far end portion) from external agents (powder or granular product used to make the tablets or disinfecting liquids used to wash the machine) but also preventing the lubricating fluid from escaping and keeping the entire tablet press machine at an optimum level of sterility.

The invention described can be subject to modifications and variations without thereby departing from the scope of the inventive concept.

What is claimed is:

1. A tablet press machine (100) comprising a hopper (1) for feeding a powder or granular product (2) to a first disc (3a) that rotates about a vertical axis (X) and is equipped with evenly distributed holes or dies (3); a second disc and a third disc (4, 6) that are positioned, respectively, above and below the first disc (3a), and that rotate about said vertical axis (X) and support respective pluralities of upper and lower reciprocating punches (5, 7); means for driving the punches (5, 7) in pairs in synchronised, reciprocating fashion towards and away from each other in a vertical direction when each pair of punches (5, 7) is aligned with one of the dies (3) on the first disc (3a); each of the punches (5, 7) comprising a cylindrical supporting shank (8) slidably engaged with a matching seat (9) formed in the respective disc (4; 6) and being equipped at one end with a working head (10) upon which the drive means act; and sealed protection means (11) fitted to each cylindrical shank (8) of each punch (5, 7), these protection means (11) consisting of concertinaed sleeves (12); the machine being characterised in that each concertinaed sleeve (12) has an annular portion (13) constituting its far end relative to the working head (10), forming an annular seal and providing also a removable element used to attach support means (14) that protrude from the respective disc (4, 6); the near end (15) of each concertinaed sleeve (12) relative to the working head (10) presenting an enlarged annular portion (16) that engages with a matching annular groove (17) in the cylindrical shank (8) to provide a tight seal.

2. The machine according to claim 1, characterised in that the annular, far end portion (13) comprises, as a single component, a first section (18) forming a groove used to fit the support means (14), and a second section (19) forming an annular flare designed to seal the cylindrical shank (8) from the inside out and from the outside in.

3. The machine according to claim 1 or 2, characterised in that the support means (14) comprise, for each punch (5, 7), a metal ring (20) connected to the respective disc (4, 6) at each seat (9) in the punch (5, 7) and being equipped with an annular attachment element (21) protruding from the disc (4, 6) and forming an undercut extending in a direction opposite to the corresponding cylindrical shank (8) and designed to be engaged with the first section (18) in the annular far end portion (13).

4. The machine according to claim 1 or 2, characterized in that each of the concertinaed sleeves (12) fitted to the upper punches (5) also presents, at the enlarged annular portion (16) of its near end (15), a section (22) that forms an annular chamber (23) for collecting the fluid used to lubricate the cylindrical shank (8).

5. The machine according to claim 3, characterized in that each of the concertinaed sleeves (12) fitted to the upper punches (5) also presents, at the enlarged annular portion (16) of its near end (15), a section (22) that forms an annular chamber (23) for collecting the fluid used to lubricate the cylindrical shank (8).

* * * * *